Oct. 21, 1924.
O. A. BOEHM
1,512,013
PROCESS FOR PRODUCING GLASS FORMS
Filed July 28, 1922    2 Sheets-Sheet 1
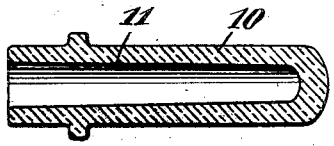
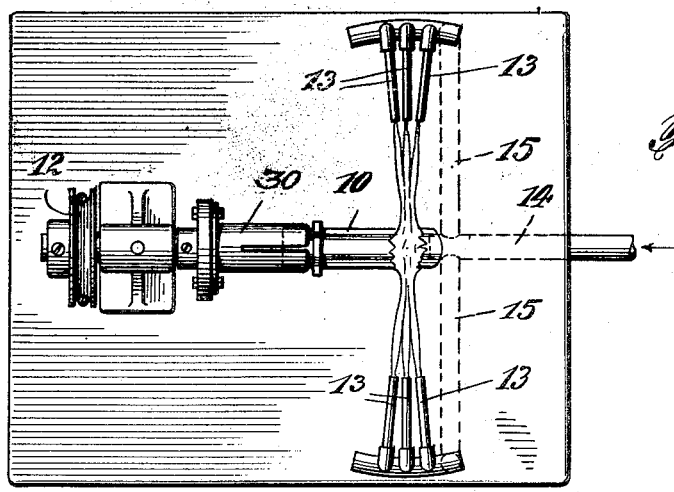
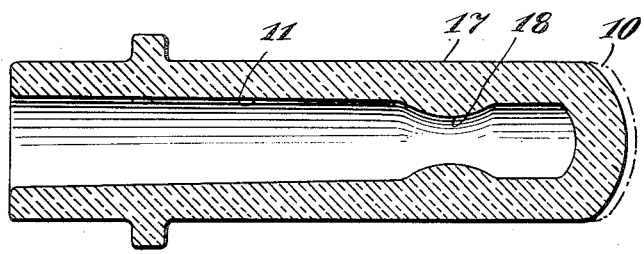
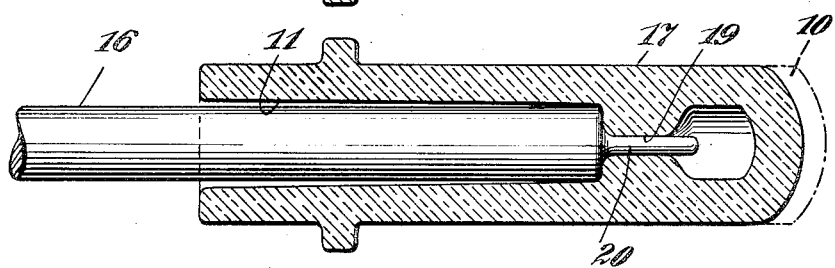
Inventor
Oscar A. Boehm
By his Attorney Patented Oct. 21, 1924.

1,512,013

UNITED STATES PATENT OFFICE.

OSCAR A. BOEHM, OF NEW YORK, N. Y.

PROCESS FOR PRODUCING GLASS FORMS.

Application filed July 28, 1922. Serial No. 578,085.

*To all whom it may concern:*

Be it known that I, OSCAR A. BOEHM, a citizen of the United States, residing at New York city, county of New York, borough of Manhattan and State of New York, have invented new and useful Improvements in Processes for Producing Glass Forms, of which the following is a full, clear, and exact specification.
My invention relates to methods for the formation of glass forms and refers particularly to methods for the production of glass insulators for spark plugs.

The employment of glass spark plug insulators has many advantages over the use of the ordinary porcelain ones, one of the principal advantages of the former being the ability to see the flash of the electric spark without dismembering, or changing, the spark plug during the observation.

The value of transparent insulators of this character is so generally recognized and acknowledged that it is not deemed necessary to elaborate upon it.
In order that the full efficiency of the exterior observation of the spark flash may be accomplished, it is necessary that the glass insulators be a peculiar and particular construction, differing in this respect from the formation of the porcelain insulator in which the exterior observation of the spark flash is not possible on account of the opaqueness of the porcelain.

On account of this necessary form of glass insulators, it is impossible, or extremely difficult, to produce them by the ordinary methods of glass molding, or glass blowing, and hence, their practical application and adoption has been greatly hindered.
I have invented a process for the rapid, economical and accurate production of glass insulators for spark plugs, which allows of their manufacture and general use for the purposes described.
The accompanying drawings and description thereof are given as a means for clearly defining my invention, although I do not limit myself to the particular size, shape, number or arrangement of parts, or particular order of steps, as shown and described.

In the accompanying drawings showing modifications of the process of my invention, similar parts are designated by similar numerals.
Figure 1 illustrates the glass form used as the starting material for my process.

Figure 2 is a diagrammatic top plan view of one form of a device for the following of my process.

Figure 3 is a sectional view of the device after the first step of formation.

Figure 4 is a sectional view of the device during the second step of formation with the forming plunger in position.

Figure 5 is an end view of the forming plunger.

Figure 6:
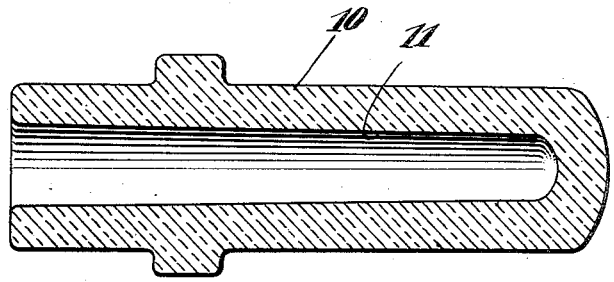
Figure 6 is a sectional view of a glass form used as the starting material for the process shown in the three following figures.

The device shown in the first five figures is produced by the following process:—

A stamped, molded or blown glass device 10, shown in Figure 1, having one end closed and one end open, the bore 11 being expanded slightly outwardly is held within the revoluble member 30 which is connected to a means of revoluble movement 12. Blowpipes 13, 13, 13 are fed by the gas mains 14, 15, 15 and are so positioned that the gas flames may be impinged upon a predetermined portion of the form 10. Any suitable mechanism may be employed in connection with the revoluble power 12, or otherwise, for the regular reciprocal movement of a forming plunger 16, back and forth through the open end of the form 10 and thereinto. The gas flame is impinged upon a predetermined portion of the form 10, as at 17, causing the glass at this point to soften and flow inwardly forming the device of Figure 3, with the contracted bore 18. This heating is continued, during all of which time the plunger 16 is reciprocating back and forth within the bore until finally the portion 17 has contracted the bore 19 to the diameter of the portion 20 of the forming plunger 16.

A hole may be made in the closed end, if desired, as described later. When the desired form is obtained, the glass is annealed in any suitable manner.

It will be noted that during this operation, the reciprocal movement of the forming plunger 16, 20 prevents the molten glass to adhere thereto and that any desired diameter of contracted bore may be obtained, dependent upon the diameter of the forming plunger element 20 employed.

Figure 7:
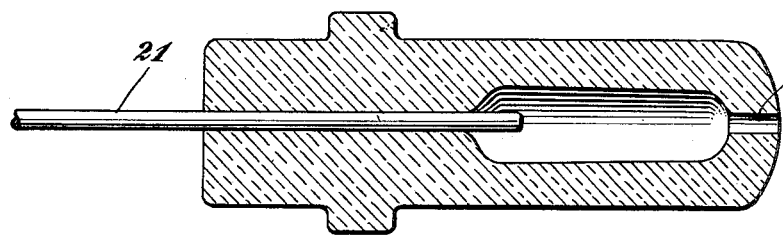
Figure 7 is the device of Figure 6 after the first step of formation with one forming plunger in position and with a hole in the formerly closed end.
Figure 8:
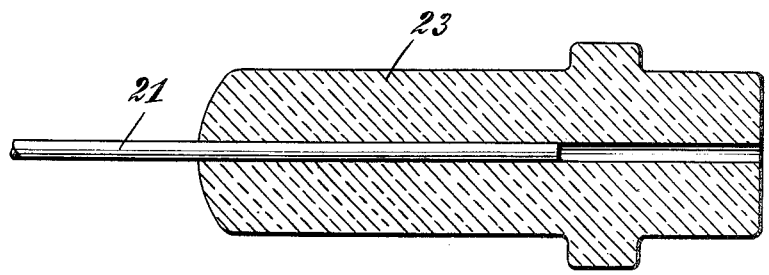
Figure 8 is the device of Figure 7 after the next step of formation with the forming plunger in position.
Figure 9:
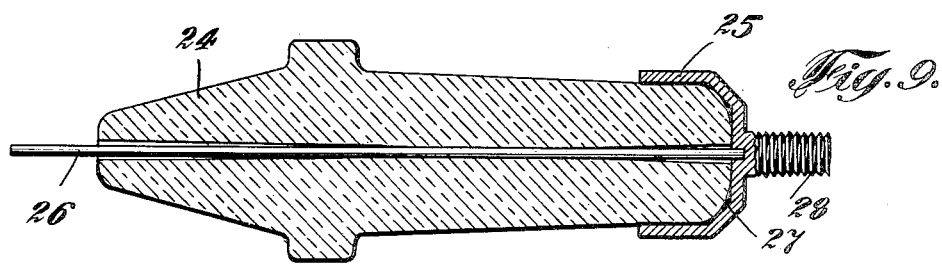
Figure 9 is the finished device, capped and with the wire inserted and maintained therein.

In producing the particular device shown in Figures 6, 7, 8 and 9, the glass form 10 is held by revoluble means, gas heated and subjected to the reciprocal movement of a forming plunger as described above. In this case, the gas flames are impinged upon the portion during the movement of the forming plunger 21 until the bore is contracted, as shown in Figure 7, a small hole 22 being made in the closed end by means of a blow-pipe or otherwise. The plunger 21 is then withdrawn, the device reversed and the plunger 21 inserted through the opening 22, and during its reciprocal movement the gas flame is impinged upon the portion 23 until the bore in that portion of the device has been contracted as shown in Figure 8, the device thus having a contracted bore throughout its entire length. The former open end of the form 10 is then drawn out 24. The entire device is annealed in any suitable manner. The electrical transmittable cap 25, carrying the electrode 26, is then cemented 27 to the one end of the glass insulator, the threaded member 28 allowing of the attachment of an electric wire. The glass insulator is thus in form to be inserted within the metallic casing of a spark plug.

From the above, it will be seen that the process of my invention presents an easy means for economically and accurately producing glass forms of the described character.

What I claim is:—

1. The process of producing glass forms having a bore which comprises heating a portion of a glass form having a bore open at one end and closed at the other thereby causing a contraction of the bore in the vicinity of the heating, causing a forming plunger to have a reciprocating movement within the bore during the heating operation and forming an opening in the closed end of the form.

2. The process of producing glass spark plug insulators which comprises heating a portion of a glass form having an expanded bore open at one end and closed at the other thereby causing a contraction of the bore in the vicinity of the heating, causing a forming plunger to have a reciprocating movement within the bore during the heating operation, and heating the uncontracted portion causing the forming plunger to have a reciprocating movement within the bore during the heating operation whereby a uniform bore will be produced within the form.

3. The process of producing glass spark plug insulators which comprises heating a portion of a glass form having an expanded bore open at one end and closed at the other thereby causing a contraction of the bore in the vicinity of the heating, causing a forming plunger to have a reciprocating movement within the bore during the heating operation, extending the bore through the closed end, heating the uncontracted portion causing the forming plunger to have a reciprocating movement within the bore during the heating operation whereby a continuous contracted bore will be produced through the form.

Signed at New York city, in the county of New York and State of New York, this 26th day of July, 1922.

OSCAR A. BOEHM.